(12) United States Patent
Wobben

(10) Patent No.: US 6,837,681 B2
(45) Date of Patent: Jan. 4, 2005

(54) WIND POWER PLANT WITH A PARTICLE SENSOR

(76) Inventor: Aloys Wobben, Argestrasse 19, Aurich D-26607 (DE)

(*) Notice: Subject to any disclaimer, the term of this patent is extended or adjusted under 35 U.S.C. 154(b) by 93 days.

(21) Appl. No.: 10/275,541

(22) PCT Filed: Mar. 2, 2001

(86) PCT No.: PCT/EP01/02376
§ 371 (c)(1),
(2), (4) Date: Apr. 21, 2003

(87) PCT Pub. No.: WO01/86142
PCT Pub. Date: Nov. 15, 2001

(65) Prior Publication Data
US 2003/0165379 A1 Sep. 4, 2003

(30) Foreign Application Priority Data
May 6, 2000 (DE) .......................... 100 22 129

(51) Int. Cl.[7] .................................................. F03D 7/04
(52) U.S. Cl. .............................. 416/1; 416/32; 416/31; 416/36; 416/37; 415/1; 415/13; 415/17; 415/18
(58) Field of Search .................. 415/1, 13, 17–18, 415/118, 2.1, 3.1, 4.1–4.5; 416/1, 32, 36, 37, 39, 31, 61

(56) References Cited

U.S. PATENT DOCUMENTS

| 5,313,202 A | 5/1994 | Hansman, Jr. et al. |
| 5,474,261 A | 12/1995 | Stolarczyk et al. |
| 5,748,091 A | 5/1998 | Kim |
| 5,900,821 A | 5/1999 | Petzold |

FOREIGN PATENT DOCUMENTS

| JP | 62-214275 A | * 9/1987 | .................. 416/37 |
| WO | WO 94/04820 | 3/1994 | |

* cited by examiner

Primary Examiner—Christopher Verdier
(74) Attorney, Agent, or Firm—Seed IP Law Group PLLC

(57) ABSTRACT

Wind power installations using more modern technology have long been known. Such wind power installations have rotors comprising at least one or more rotor blades. The rotors and accordingly the rotor blades carried thereby of wind power installations are subjected to a particular degree to the ambient environmental influences such as for example rain, snow, hail or also insects. In particular the leading edges of the rotor blades are heavily loaded in that respect. In that situation it can happen that the rotor blades and in particular the leading edges thereof, after some time, suffer from (mechanical) damage, for which cost-intensive repair is necessary, especially as a crane is frequently required for that purpose and the entire wind power installation is also stopped for a prolonged period due to the repair and under some circumstances even individual rotor blades have to be transported away to the repair location. The object of the present invention is to reduce the erosion damage at the rotor blades and to avoid the above-mentioned disadvantages. A method of operating a wind power installation having at least one sensor for detecting the number and/or the speed and/or the impulse of particles which impinge on the sensor, with a data processing and control device for processing the measurement data detected by the sensor, wherein the rotary speed of the rotor of the wind power installation is reduced (by means of the data processing/control device) and/or the wind power installation is stopped if a particle measurement value measured by the sensor is exceeded.

20 Claims, 1 Drawing Sheet

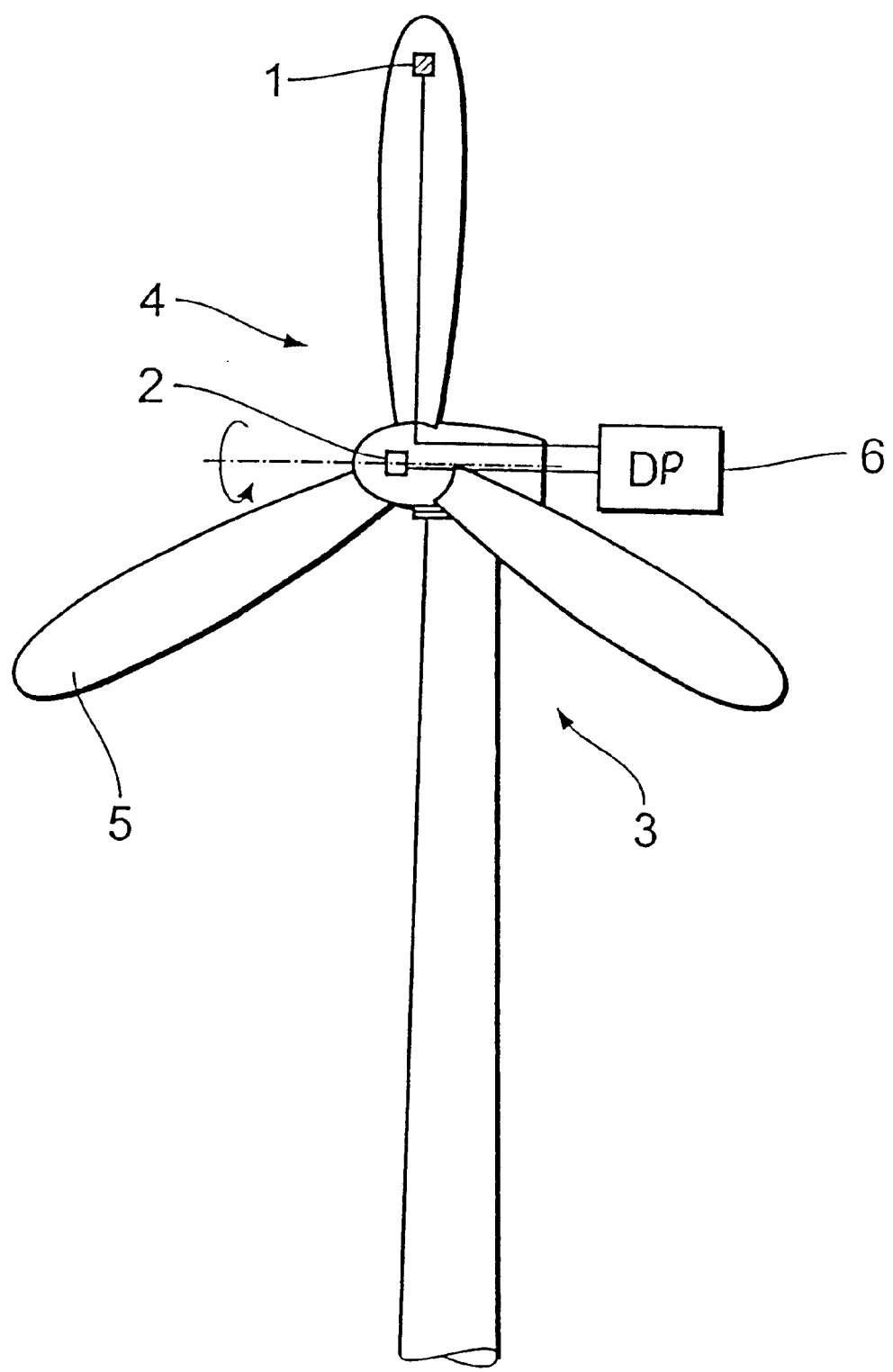

WIND POWER PLANT WITH A PARTICLE SENSOR

BACKGROUND OF THE INVENTION

1. Field of the Invention

A method of operating a wind power installation and a wind power installation for carrying out the method.

2. Description of the Related Art

Wind power installations using more modern technology have long been known. Such wind power installations have rotors comprising at least one or more rotor blades. The rotors and accordingly the rotor blades carried thereby of wind power installations are subjected to a particular degree to the ambient environmental influences such as for example rain, snow, hail or also insects. In particular the leading edges of the rotor blades are heavily loaded in that respect. In that situation it can happen that the rotor blades and in particular the leading edges thereof, after some time, suffer from (mechanical) damage, for which cost-intensive repair is necessary, especially as a crane is frequently required for that purpose and the entire wind power installation is also stopped for a prolonged period due to the repair and under some circumstances even individual rotor blades have to be transported away to the repair location.

Such damage is to be attributed to erosion effects which damage the surface—the so-called gel coat—of the rotor blades, which as the counterpart results in a worsening of the aerodynamic properties of the blades.

BRIEF SUMMARY OF THE INVENTION

An object of the present invention is to reduce the erosion damage at the rotor blades.

In accordance with the invention, the object is attained by a method of having at least one sensor mounted on the rotating portion of the wind power installation for detecting the impingement of particles. The sensor can detect the number of particles which impinge within a given time. Alternatively, or in addition the sensor may also detect the speed and/or the total impulse power imparted by the particles which impinge upon the sensor. The data from the sensor is transferred to a data processing and control device. The data is processed and analyzed according to a computer program criteria. If the number of particles striking the wind power installation within a given time period exceed a threshold value, the rotary speed is reduced. Alternatively, if the speed of impact of the particles or the impulse energy of the particles in part of the sensor exceeds a predetermined threshold, the rotational speed can be reduced. The reduction in speed of the rotation of the wind power installation is based on the measured value, whether the number of particles, the speed of the particles and/or the impulse energy of the particles has exceeded a first threshold.

A wind power installation according to principles of the present invention therefore includes a rotatable blade having one or more sensors thereon. The sensors are capable of detecting the number of particles which impinge thereon. The sensors may also be of the type which detect the overall speed of the particles or alternatively the impact energy of the particles, known also as the particle impulses or the precipitation energy. A processing unit receives the data information and has the ability to slow the rotation of the rotor blades depending on the results of the sensed particles. In one embodiment, it may stop the blade completely if the sensed data exceeds a selected upper threshold.

Advantageous developments are described in the appended claims and specification.

DETAILED DESCRIPTION OF THE INVENTION

The strength of the influence of weather conditions such as rain, snow, hail or also insects on the rotor blade leading edge is substantially dependent on the rotary speed of the wind power installation. The faster the blades are rotating, the correspondingly higher is the speed of the rotor blade tip and the correspondingly greater is the impingement speed of particles such as for example raindrops, hailstones, snowflakes, insects or even grains of dust referred to hereinafter generally as particles—against the rotor blade.

Wind power installations in accordance with the state of the art are generally operated with given operating characteristics, irrespective of the weather. In the case of installations with a variable rotary speed—such as for example the wind power installations from Enercon of type E40 or E-66 et al—that signifies for example a given installation-typical rotary speed-power characteristic.

In the case of the wind power installations nowadays—of the above-mentioned type—of the order of magnitude of between 500 kW and 1.5 MW, the maximum blade tip speeds are in the range of 65–75 m/s or corresponding to 234–270 kph.

The invention is based on the realization that the greatest erosion damage is caused at the rotor blade leading edge by particles which impact against the rotor blade leading edge.

In accordance with the invention it is now proposed that a wind power installation be equipped with one or more sensors which can detect the respective (wind-independent) weather conditions and give corresponding signals to the wind power installation control system which suitably reacts thereto by reducing the rotary speed of the rotor of the installation for example in heavy rain that is to say with a high number of particles within a predetermined unit of time (for example within a minute).

The method according to the invention and the wind power installation according to the invention make it possible to avoid or drastically reduce weather-induced erosion damage to the wind power installation. That in turn results in a reduction in expensive rotor blade repairs and in addition the fact of keeping the surfaces of the rotor blades intact can afford a uniform level of efficiency of the wind power installation. The invention is described in greater detail hereinafter by means of an embodiment.

The Figure is a diagrammatic view showing a wind power installation 3 having a rotor 4 which comprises three rotor blades 5. Mounted on the rotor blade hub 4 and/or on the rotor blades 5 are sensors 1, 2 which measure there the incidence against the sensor of particles which are borne on the wind to the wind power installation. The sensor 1 is preferably on the leading edge of the rotor blade 5, but can be on other locations. The sensor or sensors are connected to a data processing device 6 (PC) of the wind power installation, which evaluates the measured data and sets for example a suitable amount/time ratio, that is to say, detects the number of particles over a given period of time. If more than a predetermined number of particles, for example 10–20 particles such as raindrops, snow, hail, or the like. Raindrops impinge on a sensor within a given unit of time, for example 5–10 seconds, the rotary speed of the wind power installation is reduced by means of a program stored in the data processing device. That admittedly also results in a reduction in the total power which the wind power installation produces. As however the rainy times are usually relatively short in comparison with the periods which are free from precipitation, that is scarcely significant and it is possible to provide for effective protection for the rotor blades if the rotary speed thereof is reduced, for example halved, during the precipitation periods.

It will be appreciated that the data processing device also processes as usual the measured wind data which are measured with other sensors and causes a reduction in the rotary speed of the rotor only when the wind speed exceeds a predetermined value.

It is also possible by means of the data processing device to effect measurement of the particle amount, particle speed and/or particle impulses (the so-called precipitation energy), that is to say the precipitation power (amount of precipitation (particles), speed of the precipitation) can be detected (integrated) over a given period of time and the reduction in the rotary speed is initiated when the precipitation energy or precipitation power exceeds a predetermined value.

It is also possible by means of the sensors to measure an addition or integration of the impulses (mass of a particle multiplied by the impingement speed of the particle).

If the impulses caused by particles exceed a predetermined value in respect of their magnitude, a reduction in rotary speed is automatically effected so that this also automatically results in a reduction in the impulse forces on the rotor blades, caused by the precipitations.

From the foregoing it will be appreciated that, although specific embodiments of the invention have been described herein for purposes of illustration, various modifications may be made without deviating from the spirit and scope of the invention. Accordingly, the invention is not limited except as by the appended claims.

What is claimed is:

1. A method of operating a wind power installation having at least one sensor for detecting the number and/or the speed and/or the impulse of particles which impinge on the sensor, with a data processing and control device for processing measurement data detected by the sensor, wherein the rotary speed of a rotor of the wind power installation is reduced and/or the wind power installation is stopped if a particle measurement value measured by the sensor is exceeded.

2. A method according to claim 1 characterised in that the rotary speed of the wind power installation is reduced and the wind power installation is stopped if a given number of particles has been measured by the sensor within a given period of time.

3. A method according to claim 1 characterised in that water, drops and/or raindrops and/or hailstones and/or grains of dust are measured as particles.

4. A method of operating a wind power installation comprising:
   detecting at a sensor the impact of particles on a rotor blade assembly of the wind power installation;
   generating measured data from the sensor output based on the impact of particles;
   comparing the value of the measured data to stored threshold data; and
   reducing the rotational speed of the rotor blade assembly if the measured value exceeds a first threshold.

5. The method according to claim 4 wherein said measured data is the number of particles which impact the rotor blade assembly within a given time period.

6. The method according to claim 5 wherein the number of particles is measured within a selected time period.

7. The method according to claim 4 wherein said measured data is the speed at which the particles are impacting the sensor.

8. The method according to claim 4 wherein said measured data is the impulse energy of the particles striking the rotor blade.

9. The method according to claim 4 further including stopping the rotation of the rotor blade if the value of the measured data exceeds a predetermined value.

10. A wind power installation, comprising:
    at least one sensor for detecting the number, the energy and/or the impulse of particles which impinge on the sensor, wherein the sensor is connected to a data processing and control device which processes measurement data ascertained by the sensor and reduces the rotary speed of the wind power installation and optionally stops the wind power installation when a predetermined particle measurement value is exceeded.

11. A wind power installation according to claim 10, characterized in that the wind power installation has a plurality of sensors for measuring particles.

12. A wind power installation according to claim 10 characterized in that the sensor or the plurality of sensors is or are arranged at or on the rotor blades of the wind power installation.

13. A wind power installation according to claim 10, characterized in that the sensor detects the number of impinging particles (per time) and/or the impingement speed of particles against the sensor and/or the impulse value of impinging particles.

14. A wind power installation according to claim 10, characterized in that the sensor is arranged in a leading edge of a rotor blade of the wind power installation.

15. A wind power installation according to claim 14 characterized in that at least one sensor is arranged in the region of the rotor blade tip or another region of the wind power installation, such at a pod.

16. A wind power installation comprising:
    a rotatable blade assembly;
    a sensor positioned on the wind power installation, the sensor being capable of detecting the impact of particles on the wind power installation;
    a data processing and control device coupled to the rotatable blade assembly for sending instructions to reduce the rotary speed of the rotatable blade assembly if the measured particle impact data exceeds a predetermined value.

17. The apparatus according to claim 16 wherein said sensor is positioned on the rotatable blade assembly itself.

18. The apparatus according to claim 17 wherein the sensor is positioned on a leading edge of a rotary blade of the rotatable blade assembly.

19. The apparatus according to claim 16 wherein the impact data includes a count of the number of particles.

20. The apparatus according to claim 16 wherein the impact data includes the impact energy of the particles.

* * * * *